Figure 6:
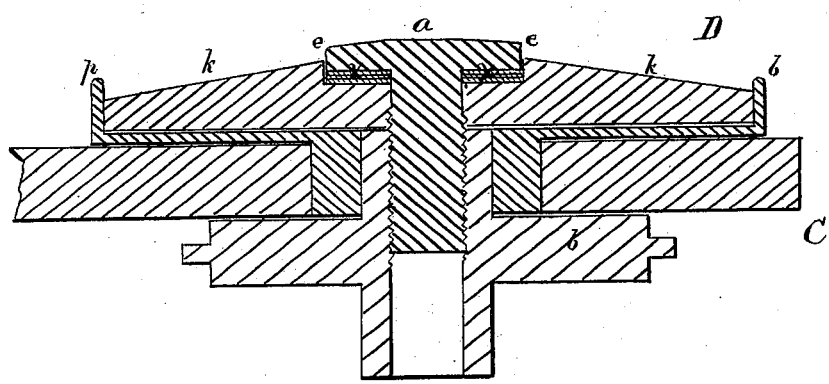

2 Sheets—Sheet 1.
A. WHITTEMORE.
Peg-Float.
No. 209,784. Patented Nov. 12, 1878.
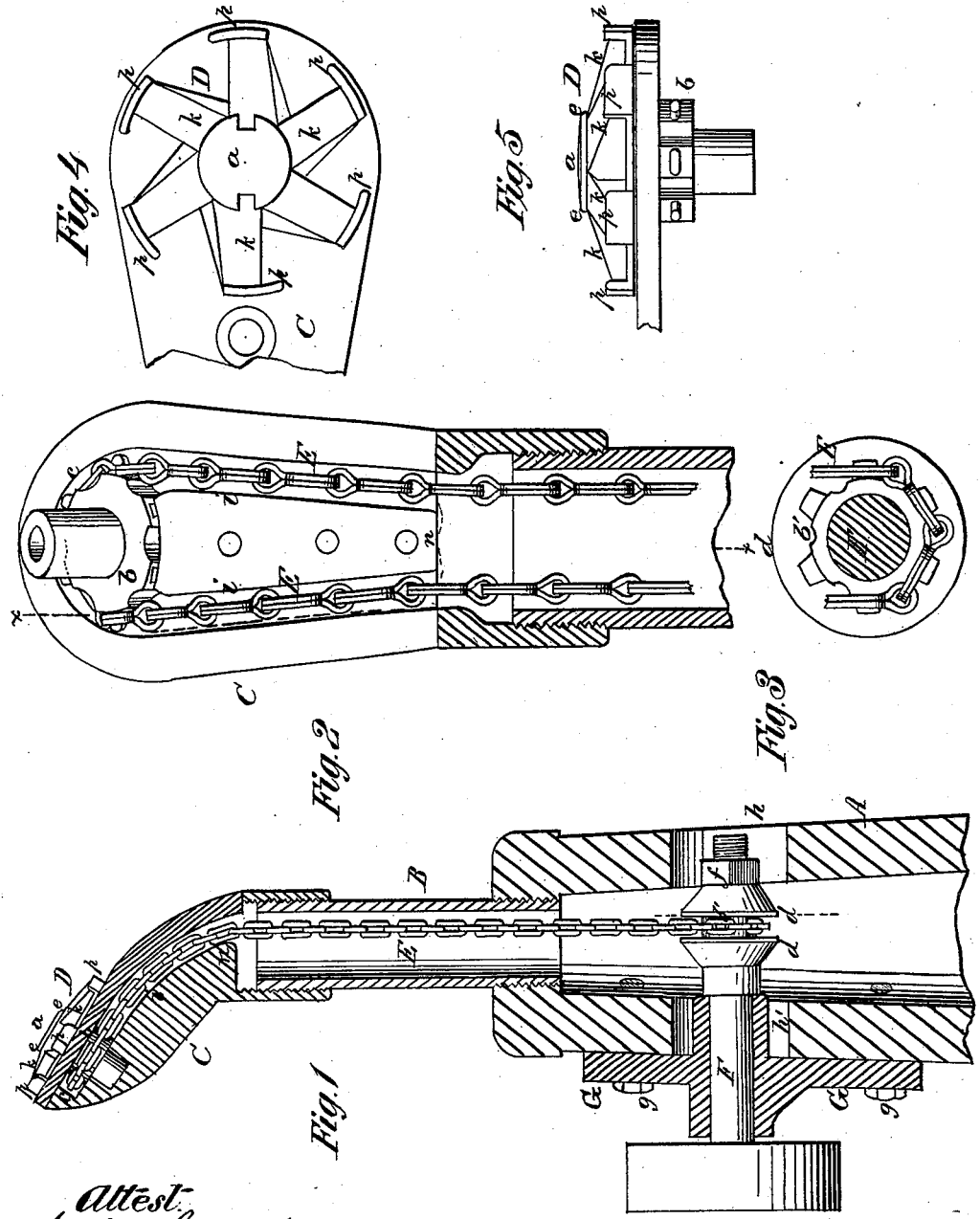

2 Sheets—Sheet 2.

A. WHITTEMORE.
Peg-Float.

No. 209,784.  Patented Nov. 12, 1878.

Attest:
Julia Campbell
M R Colgan

Inventor
Amos Whittemore
per R. T. Campbell, Attorney

UNITED STATES PATENT OFFICE.

AMOS WHITTEMORE, OF CAMBRIDGEPORT, MASSACHUSETTS.

IMPROVEMENT IN PEG-FLOATS.

Specification forming part of Letters Patent No. 209,784, dated November 12, 1878; application filed October 19, 1878.

*To all whom it may concern:*

Be it known that I, AMOS WHITTEMORE, of Cambridgeport, in the county of Middlesex and State of Massachusetts, have invented a new and Improved Peg-Float; and I do hereby declare that the following is a full, clear, and exact description of the construction and operation of the same, reference being had to the annexed drawings, making a part of this specification, and to the letters and figures of reference marked thereon.

Figure 1 of the drawings is a section taken vertically through one side of the head-stock, its hollow shaft and pedestal, showing the driving devices for the cutters. Figs. 2 and 3 are detail views of the chain-wheels, portions of the endless chain, and the grooved head-stock. Figs. 4 and 5 are views of the rotating cutter-head. Fig. 6, Sheet 2, is an enlarged sectional view of the cutter-head, the cap of the head-stock, and the upper chain-wheel.

Similar letters of reference indicate corresponding parts in the several figures.

This invention relates to peg-floats wherein a rotating cutter is applied on the inclined face of a head-stock that is mounted on a vertical hollow shaft.

The main object of my invention is to drive the cutter-head by means of an endless chain and chain-wheels, which are inclosed inside of the inclined head-stock and its hollow supports, and arranged in a peculiar way, whereby the objections to the use of gear-wheels are obviated, and the machine made to run smoothly, and with little or no noise, as will be hereinafter explained.

Another object of my invention is to construct the cutter-head with guards or shields at each end of every cutting-blade for the purpose of effectually preventing the cutting of the insoles of shoes while trimming the pegs, as will be hereinafter explained.

The following is a description of my invention:

In the annexed drawing, A designates a hollow pedestal, of any convenient size, into the upper end of which is secured a hollow shaft, B. On the upper end of shaft B the head-stock C is rigidly secured, which is inclined, as shown in Fig. 1, and constructed of two parts, the upper one or cap being removable.

D designates the rotary cutter-head, which is constructed as will be hereinafter fully described. This cutter-head is secured by a screw-pin, *a*, to the spindle of a chain-wheel, *b*, which is inclosed in a recess, *c*, at the upper end of the head-stock, and is accessible by removing the cap of the latter.

E designates an endless chain, which passes around the wheel *b*, and also around a chain-wheel, *b'*, and receives the spurs of these wheels in its links, so that the cutter-head D receives from the chain a positive rotary motion. The chain-wheel *b'* is constructed with flanges *d d*, which prevent the displacement of the chain, and the flanges, with their wheel, are secured on a shaft, F, by means of a nut, *f*. Shaft F is borne by a plate, G, which is vertically adjustable by loosening nuts *g g*. This adjustment of shaft F allows chain E to be kept under proper tension and to be quickly removed from the machine. The hole *h* in the pedestal A allows the chain E to be adjusted by the hand upon the chain-wheel *b'*, and the hole *h'* allows the adjustment of shaft F and bearing-plate G for tightening or loosening chain E.

It will be clearly seen by reference to Fig. 2 that the chain E runs edgewise in two converging grooves, *i i*, in the head-stock C. Without these guiding-grooves the chain would not run edgewise over the angles *n*, and the machine would not work successfully.

The knives *k*, which form the cutter-head, have guards or shields *p* at their outer ends, which I have fully described in Letters Patent previously granted to me.

At the inner termini of the knives *k* is the head of the screw-pin *a*, which secures the cutter-head to the spindle of chain-wheel *b*. This head is circular and convex, and its periphery is raised above the planes of the knives high enough to form a shoulder, *e*, and to serve, in combination with the guards or shields *p*, as a protection to the leather of the upper of boots and shoes during the act of removing the ends of the pegs therein.

In practice, I shall make a small hole through the cap of the head-stock, for the purpose of oiling the chain, its wheels, and the grooves or channels $i\,i$.

Between the bottom of the recess which receives the head of the screw-pin $a$ and the head of this pin I insert washers $x$, for the purpose of adjusting this head higher or lower with respect to the cutting-edges of the blades $k$. This is done for the purpose of compensating for the wear of both the cutters and the head of the screw-pin. An adjustment is thus effected which is important in my peg-float.

Having described my invention, what I claim as new is—

1. The shoulder or guard $e$ of the screw-pin $a$, in combination with the outer guards, $p$, and the knives $k$ of the rotary cutter-head D, substantially as and for the purposes described.

2. In combination with the rotary cutter-head and the outside guards, $p$, the center-pin $a$, adjustable substantially as described, and for the purpose set forth.

3. In a peg-float having the inclined head-stock C and hollow supports A B, the grooves $i\,i$ in the head-stock, and a chain, E, which passes around a wheel, $b$, on the spindle or hub of which the cutter-head D is fixed, in combination with wheel $b'$, substantially as described.

4. In combination with an endless chain, E, which passes around the upper wheel, $b$, on the spindle of which is applied the cutter-head D, the adjustable bearing G, attached to the hollow pedestal A, as and for the purpose set forth.

5. In a peg-float of the kind described, an inclined head-stock, C, which is recessed at $c$ and grooved at $i\,i$, and mounted on tubular supports A B, in combination with an endless chain, E, and wheels $b\,b'$, when the said chain passes around wheel $b$, and the cutter-head is fixed to the hub of this wheel, as set forth.

AMOS WHITTEMORE.

Witnesses:
R. T. CAMPBELL,
JULIA CAMPBELL.